Sept 10, 1957      H. H. HILL      2,805,643

MILKING SYSTEMS

Filed April 25, 1955

Inventor
Henry H. Hill
By Philip A. Iredell
Attorney

United States Patent Office 2,805,643
Patented Sept. 10, 1957

2,805,643

MILKING SYSTEMS

Henry H. Hill, Yreka, Calif.

Application April 25, 1955, Serial No. 503,530

2 Claims. (Cl. 119—14.07)

This invention relates to improvements in milking systems and provides a greatly simplified and less costly system while maintaining all of the advantages and actually increasing the efficiency, eliminating a number of pulsators and other rather expensive elements and materials, with consequent reduction in the cost of maintenance and repairs, as also in the original cost of installing the system.

The conventional milking system provides a pulsator for each milking unit and requires a relatively large diameter vacuum line, and the pulsators operate independently and are not synchronized, inducing minor pulsations in the vacuum line and thus lowering the efficiency of the system. The pulsators, being rather sensitive instruments, require regular attention and occasional repairs and adjustments for maintaining suitable operation and timing.

My milking system uses only a single pulsator and constitutes a master pulsator, for any number of milking units up to eight or more, with all milking units operating in synchronism, thereby operating at maximum efficiency while eliminating up to 90% of the pulsators of the conventional milking system and thereby greatly reducing the cost of installation, maintenance and repairs. This system has been operated with eight milking units on a single pulsator with perfect results and maximum efficiency which shows that the system is not limited to the eight milking units for one master pulsator.

In addition, my milking system employs an auxiliary vacuum break for the pulsator line for more spontaneous reversal of the milking cycle. Although the bowl type of milking unit is illustrated, any other suitable unit, such as the claw type, which is not illustrated as it is well known in the art, is well adapted to my system. Furthermore, the system is not limited to the vacuum operated pulsator as any other type, such as the magnetically operated or pressure operated type may be substituted with equally good results. A relatively small diameter pulsator line is substituted for the relatively large diameter vacuum line, resulting in further reduction in the cost of installation. A three-eighths inch pulsator line has been found practical for eight milking units, while the conventional milking systems require about one and a quarter inch for the vacuum line. The diameter of pulsator line is dependent on the number of milking units operated and the length of the line, and decreases with increased length since the displacement should remain about constant irrespective of the number of milking units or the length of the line.

The conventional milking system has a pulsator for each milking unit, connected to the vacuum line for claw type units, and mounted on the bowl cover for bowl types, while in my system a plain distributor head is substituted for the pulsator on the bowl cover and no distributor is required for the claw type which has a direct connection to the pulsator line.

The objects and advantages of the invention are as follows:

First, to provide a milking system of high efficiency with a greatly reduced number of parts.

Second, to provide a milking system in which a single pulsator serves any number up to eight or more milking units.

Third, to provide a milking system as outlined with an auxiliary vacuum break for the pulsator line for increasing the rapidity of reversals of the cycles and consequently the efficiency of the system.

Fourth, to provide a milking system as outlined with a highly efficient releaser for, and discharge of the milk while maintaining a constant degree of vacuum in the milk line.

In describing the invention reference will be had to the accompanying drawings, in which.

Figure 1:
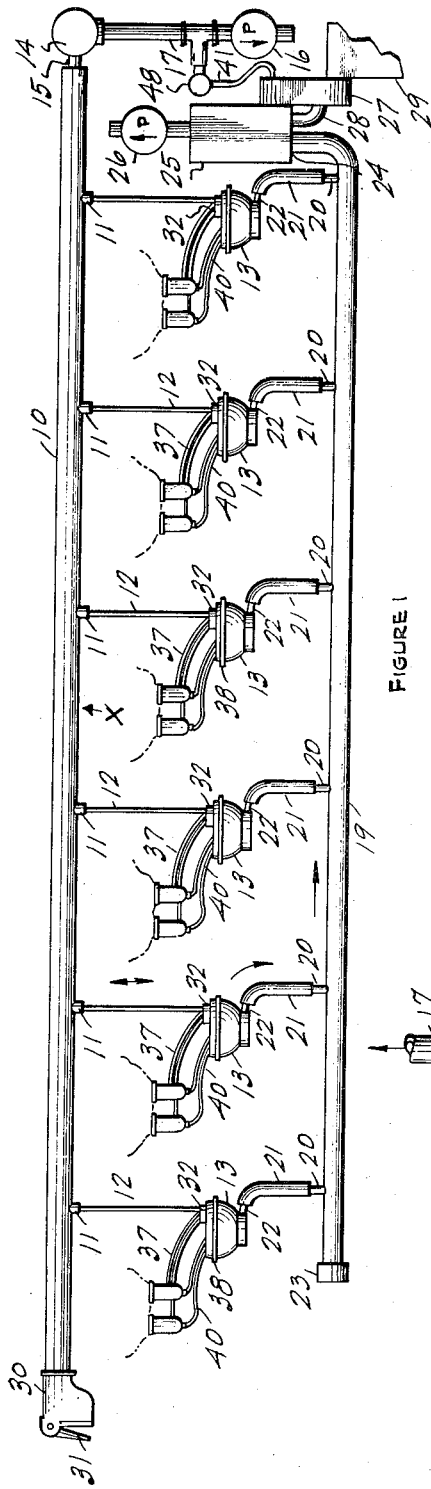
Fig. 1 is a diagrammatic view of the invention as applied to bowl type milking units.
Figure 3:
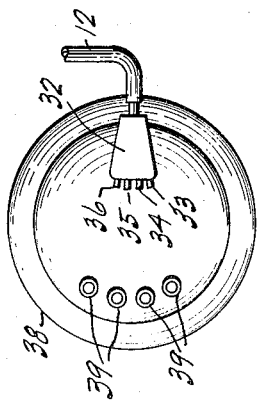
Fig. 3 is a top plan view of the cover for one of the bowl type milking units with a distributor head substituted for the conventional pulsator, and is also shown to an enlarged scale.
Figure 2:
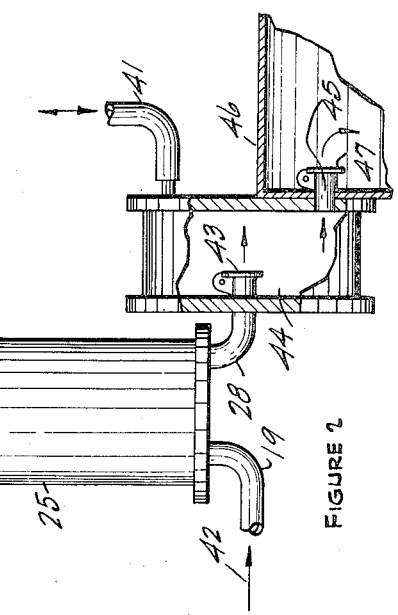
Fig. 2 is a front elevation of the releaser shown to an enlarged scale and partly in section.

The invention consists of a pulsator line 10 having a plurality of nipples 11 for connection through tubes 12 to the various milking units 13. A pulsator 14 of suitable capacity is connected to one end of the pulsator line 10 as indicated at 15, and to a vacuum pump 16 through the main vacuum line 17.

Obviously, though not shown, the pulsator can be connected to the pulsator line at some intermediate point, such as centrally at X in which case a smaller diameter pipe can be used with resulting slight increase in efficiency and capable of operating additional milking units, though having the disadvantage of requiring extension of the vacuum line to that point unless the vacuum pump is installed in that immediate area.

The milk line 19 is conventionally coupled to the milking units and has a nipple 20 for each milking unit, and connected to the claws or to the lower ends of the bowls 13 through the tubes 21 as indicated at 22, one end of the milk line being closed as indicated at 23, and the other end being connected to the releaser as indicated at 24 and opening directly into this releaser housing 25, the upper end of this releaser housing being connected to a vacuum pump 26. This releaser housing also has direct connection with the milk trap and discharge housing 27 as indicated at 28 from which the milk is discharged into a suitable receiver 29.

The pulsator line 10 terminates in an auxiliary vacuum break such as the flap valve which includes the enlarged housing 30 which has a normally open valve 31 and which may be spring or gravity controlled, being normally open only to such extent as to be drawn closed when vacuum conditions are established in the pulsator line, and opening with initial break of the vacuum through the agency of the master pulsator. If the pulsator is connected centrally or some intermediate point of the pulsator line, one of these valves will be applied to each end of the pulsator line.

The distributor head for the bowl type milking unit as indicated at 32 is provided with four nipples 33, 34, 35 and 36 for connection through the tubes 37 to the four teat cup shells of the teat cup assemblies, while the inflations are connected to the milk line through the cover 38 by means of the conventional nipples 39 and tubes 40.

The releaser discharge section is connected through a conduit 41 and pulsator 48 to the vacuum line 17, and this pulsator operates at a relatively low speed, in the neighborhood of 20 cycles per minute, while the master pulsator operates at a speed of 50 to 70 cycles, depending on the length of the pulsator line and the number of milking units on the line.

The milk is drawn into the releaser housing 25 from the milk line continuously as indicated by the arrow 42, there being no shut-off period. The vacuum pump 26 keeps the flap valve 43 closed when the vacuum in line 41 is broken by the pulsator 48. When the pulsator reverses, a vacuum is developed in the milk discharge housing 44, balancing the pressures in housings 25 and 44, consequently the valve 43 is balanced and the milk flows into the milk discharge housing 44.

When the pulsator 48 reverses, the vacuum is broken in the milk discharge housing causing the valve 43 to close by the vacuum in the housing 25, and the milk discharges through the passage 45 into the storage tank or receiver 46, the flap valve closing with the next reversal of the pulsator 48.

Thus a very efficient milking system is provided with an absolute minimum of equipment and materials coupled with a minimum maintenance expense.

I claim:

1. A milking system comprising a milk line, a plurality of milking units each including a plurality of teat cup assemblies each including a shell and an inflation, with said inflations in communication with said milk line, a single continuous vacuum line and a pulsator line and a source of vacuum in communication with said vacuum line, and a master pulsator connecting said vacuum line to one end of said pulsator line, said pulsator line having direct connections to all of said shells of said milking units, a releaser, and a pulsator in communication between said vacuum line and said releaser, whereby a plurality of milking units are simultaneously actuated and controlled by a single master pulsator, a normally open valve for the other end of said pulsator line and closed through reduction of pressure in said pulsator line and released to open with increase in pressure when atmospheric air is admitted through release by said master pulsator for breaking of the vacuum at both ends of the pulsator line for accelerated dissipation of the reduced pressure for increased efficiency in operation of the milking units.

2. A milking system comprising a single pulsator line having a pressure controlled valve at one end, a source of vacuum and a vacuum line, a master pulsator connecting said vacuum line to said pulsator line, a milk line, a receiver, a vacuum pump in communication with said receiver, a plurality of milking units having the shells of their teat cups connected to said pulsator line and the inflations connected to said milk line with said milk line in communication with said receiver, a releaser for said receiver, a pulsator in communication with said vacuum line and with said releaser for operating said releaser for discharge of milk from said receiver to storage, said pressure controlled valve opening for admission of air through reduced differential when said master pulsator releases air to the pulsator line, for accelerated dissipation and increased milking unit capacity, whereby up to ten or more milking units can be efficiently operated through a single pulsator line and a single master pulsator.

References Cited in the file of this patent

UNITED STATES PATENTS

| 1,952,544 | Gordon | Mar. 27, 1934 |
| 1,977,511 | Graves | Oct. 16, 1934 |
| 2,583,723 | Berry | Jan. 29, 1952 |

FOREIGN PATENTS

| 104,619 | Australia | Aug. 4, 1938 |